(12) United States Patent
Yamaguchi et al.

(10) Patent No.: US 7,276,462 B2
(45) Date of Patent: Oct. 2, 2007

(54) DIELECTRIC COMPOSITION AND DIELECTRIC FILM ELEMENT

(75) Inventors: Hirofumi Yamaguchi, Komaki (JP); Kei Sato, Tokai (JP); Toshikatsu Kashiwaya, Inazawa (JP)

(73) Assignee: NGK Insulators, Ltd., Nagoya (JP)

( * ) Notice: Subject to any disclaimer, the term of this patent is extended or adjusted under 35 U.S.C. 154(b) by 163 days.

(21) Appl. No.: 11/209,332

(22) Filed: Aug. 23, 2005

(65) Prior Publication Data

US 2006/0044730 A1    Mar. 2, 2006

Related U.S. Application Data

(60) Provisional application No. 60/611,926, filed on Sep. 22, 2004.

(30) Foreign Application Priority Data

Aug. 25, 2004  (JP) ............ 2004-245833
Jul. 19, 2005   (JP) ............ 2005-208366

(51) Int. Cl.
*C04B 35/491* (2006.01)
*H01L 41/04* (2006.01)

(52) U.S. Cl. ............... 501/135; 501/136; 252/62.9 PZ; 310/311

(58) Field of Classification Search ............ 310/311; 501/135, 136; 252/62.9 PZ
See application file for complete search history.

(56) References Cited

U.S. PATENT DOCUMENTS

| | | | | |
|---|---|---|---|---|
| 6,413,443 | B1 * | 7/2002 | Furukawa et al. | .... 252/62.9 PZ |
| 6,565,997 | B2 * | 5/2003 | Kashiwaya | .......... 428/701 |
| 6,713,123 | B2 * | 3/2004 | Kashiwaya et al. | ........ 427/100 |
| 7,019,441 | B2 * | 3/2006 | Kashiwaya | .......... 310/330 |
| 7,045,075 | B2 * | 5/2006 | Kasukawa et al. | .... 252/62.9 PZ |

(Continued)

FOREIGN PATENT DOCUMENTS

EP    1403897    3/2004

(Continued)

OTHER PUBLICATIONS

Yasuoka and Ishii, "kyoyudentai inkyoku wo mochiita parusu denshigen (Pulsed electron sources with ferroelectric cathodes)", Oyobutsuri vol. 68, No. 5, pp. 546 to 550 (1999).

(Continued)

*Primary Examiner*—Karl Group
(74) *Attorney, Agent, or Firm*—Burr & Brown

(57) ABSTRACT

Provided is a dielectric composition which, when applied to an electron emitter, enables suppression of reduction of electron emission quantity with passage of time. The dielectric composition contains, as a primary component, a PMN-PZ-PT ternary solid solution composition represented by the following formula $Pb_xBi_p(Mg_{y/3}Nb_{2/3})_aTi_{b-z}M_zZr_cO_3$ [wherein x, p, and y satisfy the following relations: $0.85 \leq x \leq 1.05$, $0.02 \leq p \leq 0.1$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200); z satisfies the following relation: $0.02 \leq z \leq 0.10$; and M is at least one element selected from among Nb, Ta, Mo, and W], and contains Ni in an amount of 0.05 to 2.0 wt. % as reduced to NiO.

14 Claims, 5 Drawing Sheets

U.S. PATENT DOCUMENTS

| | | | |
|---|---|---|---|
| 7,052,732 B2 * | 5/2006 | Kashiwaya et al. | 427/100 |
| 7,176,155 B2 * | 2/2007 | Kashiwaya et al. | 501/134 |
| 2004/0090398 A1 | 5/2004 | Takeuchi et al. | |

FOREIGN PATENT DOCUMENTS

| | | |
|---|---|---|
| JP | 44-26125 | 11/1969 |
| JP | 45-30151 | 9/1970 |
| JP | 46-20944 | 6/1971 |
| JP | 7-147131 | 6/1995 |
| JP | 2654571 | 5/1997 |
| JP | 2000-178068 | 6/2000 |
| JP | 2000-285801 | 10/2000 |
| JP | 3295871 | 4/2002 |
| JP | 2004-146365 | 5/2004 |
| JP | 2004-172087 | 6/2004 |

OTHER PUBLICATIONS

V.F. Puchkarev, G.A. Mesyats "On the mechanism of emission from the ferroelectric ceramic cathode," J. Appl. Phys., vol. 78, No. 9, Nov. 1, 1995, pp. 5633-5637.

H. Riege, "Electron emission ferroelectrics—a review," Nucl. Instr. And Mech., A340, pp. 80-89, 1994.

* cited by examiner (A)

(B)

(C)

DIELECTRIC COMPOSITION AND DIELECTRIC FILM ELEMENT

BACKGROUND OF THE INVENTION

1. Field of the Invention

The present invention relates to a dielectric composition, and to a dielectric film element employing the dielectric composition. More particularly, the present invention relates to a dielectric composition which is suitable for use in an electron emitter as an electron beam source in various devices and apparatus that utilize electron beams, such as displays (e.g., field emission displays (FEDs)), electron beam irradiation apparatus, light sources, electronic-component-manufacturing apparatus, and electronic circuit components; and to a dielectric film element employing the dielectric composition.

2. Description of the Related Art

As is generally known, the aforementioned electron emitter is configured such that a predetermined electric field is applied to an emitter section (electron emission section) in a vacuum having a predetermined vacuum level, whereby electrons are emitted from the emitter section. In application to FEDs, a plurality of electron emitters are two-dimensionally arrayed, and a plurality of phosphors corresponding to the electron emitters are arrayed with a predetermined spacing held therebetween. Among the two-dimensionally arrayed electron emitters, certain electron emitters are selectively driven so as to emit electrons therefrom. The emitted electrons collide with phosphors corresponding to the driven electron emitters. The phosphors hit by the electrons fluoresce, thereby displaying a desired image.

Specific examples of the electron emitter are disclosed in, for example, Japanese Patent Application Laid-Open (kokai) Nos. 01-311533, 07-147131, and 2000-285801 and Japanese Patent Publication (kokoku) Nos. 46-20944 and 44-26125. Such a disclosed electron emitter includes an emitter section formed of a fine conductive electrode having a pointed tip end portion, and a counter electrode provided so as to face the emitter section, and the electron emitter is configured such that when a predetermined drive voltage is applied to the emitter section and the counter electrode, electrons are emitted from the tip end portion of the emitter section.

Accordingly, forming such a fine conductive electrode having a tip end portion requires micromachining that employs etching, forming, or the like, and thus production of the electron emitter involves a complicated process. Meanwhile, a certain high level of drive voltage must be applied to the electron emitter for emitting a predetermined number of electrons from the tip end portion of the conductive electrode to a vacuum having a predetermined vacuum level. Therefore, driving the electron emitter requires an expensive drive element (e.g., IC) which is applicable to high-voltage drive.

Thus, the above-disclosed electron emitter, which includes an emitter section formed of a conductive electrode, involves a problem in that high cost is required for producing the electron emitter per se, or a device employing the electron emitter.

Therefore, an electron emitter in which an emitter section is formed of a dielectric material is devised, which emitter is disclosed in, for example, Japanese Patent Application Laid-Open (kokai) Nos. 2004-146365 and 2004-172087. General findings regarding electron emission in the case where a dielectric material is used to form an emitter section are disclosed in, for example, Yasuoka and Ishii, "Pulsed Electron Source Using Ferroelectric Cathode electrode," Applied Physics, Vol. 68, No. 5, pp. 546-550 (1999); V. F. Puchkarev and G. A. Mesyats, "On the Mechanism of Emission from the Ferroelectric Ceramic Cathode electrode," J. Appi. Phys., Vol. 78, No. 9, 1 Nov., 1995, pp. 5633-5637; and H. Riege, "Electron Emission Ferroelectrics—a Review," Nucl. Instr. and Meth. A340, pp. 80-89 (1994).

The electron emitters disclosed in Japanese Patent Application Laid-Open (kokai) Nos. 2004-146365 or 2004-172087 (hereinafter called merely "conventional electron emitters") are configured such that a cathode electrode covers a portion of the top surface of an emitter section formed of a dielectric material, and an anode electrode is provided on the bottom surface of the emitter section, or on the top surface of the emitter section with a predetermined spacing maintained between the same and the cathode electrode. Specifically, the electron emitters are configured such that an exposed portion of the top surface of the emitter section at which neither the cathode electrode nor the anode electrode is formed is present in the vicinity of a peripheral edge portion of the cathode electrode.

The conventional electron emitter is operated as follows. In a first stage, voltage is applied between the cathode electrode and the anode electrode such that the cathode electrode is higher in electric potential. An electric field induced by the applied voltage brings the emitter section (in particular, the aforementioned exposed portion) into a predetermined polarization state. In a second stage, voltage is applied between the cathode electrode and the anode electrode such that the cathode electrode is lower in electric potential. At this time, primary electrons are emitted from the peripheral edge portion of the cathode electrode, and the polarization of the emitter section is inverted. The primary electrons collide with the exposed portion of the polarization-inverted emitter section, whereby secondary electrons are emitted from the emitter section (particularly from the exposed portion). The secondary electrons fly in a predetermined direction by means of an externally applied, predetermined electric field; i.e., the electron emitter emits electrons.

SUMMARY OF THE INVENTION

However, the conventional electron emitter, which includes an emitter section formed of a dielectric material, involves a problem in that the electron emission quantity is considerably reduced due to deterioration of the emitter section as a result of repeated use of the electron emitter.

The present invention has been accomplished in view of the above-described problems, and an object of the present invention is to provide a dielectric composition which, when applied to an electron emitter, enhances the durability of the electron emitter and suppresses any reduction in the quantity of electrons emitted due to repeated use of the electron emitter. Another object of the invention is to provide a dielectric film element employing the dielectric composition.

Accordingly, the present invention provides a dielectric composition containing, as a primary component, a composition represented by the following formula (1):

$$Pb_xBi_p(Mg_{y/3}Nb_{2/3})_aTi_{b-z}M_zZr_cO_3 \qquad (1)$$

[wherein x, p, and y satisfy the following relations: $0.85 \leq x \leq 1.03$, $0.02 \leq p \leq 0.1$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W], which dielectric composition contains Ni in an amount of 0.05 to 2.0 wt. % as reduced to NiO (hereinafter, this dielectric composition will be referred to as "a first dielectric composition of the present invention").

The present invention also provides a dielectric composition containing, as a primary component, a composition represented by the following formula (2):

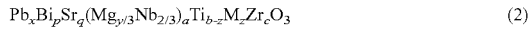
$$Pb_xBi_pSr_q(Mg_{y/3}Nb_{2/3})_aTi_{b-z}M_zZr_cO_3 \quad (2)$$

[wherein x, p, q, and y satisfy the following relations: $0.65 \leq x \leq 1.01$, $0.02 \leq p \leq 0.1$, $0.02 \leq q \leq 0.20$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W], which dielectric composition contains Ni in an amount of 0.05 to 2.0 wt. % as reduced to NiO (hereinafter, this dielectric composition will be referred to as "a second dielectric composition of the present invention," and the first and second dielectric compositions and subordinate compositions thereof will be collectively called "the dielectric composition of the present invention").

Preferably, the first dielectric composition of the present invention contains, as a primary component, a composition represented by the following formula (3):

$$Pb_x(Mg_{y/3}Nb_{2/3})_aTi_bZr_cO_3 \quad (3)$$

[wherein x and y satisfy the following relations: $0.95 \leq x \leq 1.05$ and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1)], wherein 2 to 10 mol % of Pb is substituted by Bi, 2 to 10 mol % of Ti is substituted by at least one element selected from among Nb, Ta, Mo, and W, and the NiO content is 0.05 to 2.0 wt. % on the basis of the entirety of the dielectric composition.

The dielectric composition of the present invention may be prepared through, for example, the following procedure: firstly, oxides, carbonates, etc. of elements (e.g., Pb, Mg, Nb, Ti, Zr, Ni, Bi, and Ta) are mixed such that the mole fractions of the elements fall within the above-described ranges, to thereby prepare a mixture; subsequently, the mixture is placed in a hermetic container, and then heated at a predetermined temperature; and the thus-heated product is milled so as to form particles having a predetermined particle size.

A dielectric layer is formed from the thus-prepared dielectric composition through a generally employed production process (e.g., screen printing, dipping, coating, electrophoresis, aerosol deposition, the ion beam process, sputtering, vacuum evaporation, ion plating, chemical vapor deposition (CVD), plating, and the green sheet process), whereby the below-described dielectric film element of the present invention can be produced.

Preferably, the second dielectric composition of the present invention contains, as a primary component, a composition represented by formula (3), wherein 2 to 10 mol % of Pb is substituted by Bi, 2 to 20 mol % of Pb is substituted by Sr, 2 to 10 mol % of Ti is substituted by at least one element selected from among Nb, Ta, Mo, and W, and the NiO content is 0.05 to 2.0 wt. % on the basis of the entirety of the dielectric composition. The second dielectric composition of the present invention can be prepared in a manner similar to that of the first dielectric composition.

More preferably, the first or second dielectric composition of the present invention contains Mn in an amount of 0.05 to 1.0 wt. % as reduced to $MnO_2$.

In the above-mentioned range in the present invention, the amount of Pb substituted by Bi is more preferably 2 to 5 mol % (i.e., x and p in formula (1) satisfy the following relations: $0.90 \leq x \leq 1.03$ and $0.02 \leq p \leq 0.05$). The amount of Pb substituted by Sr is more preferably 1 to 15 mol % (i.e., x and p in formula (2) satisfy the following relations: $0.70 \leq x \leq 1.02$ and $0.02 \leq p \leq 0.10$ (more preferably $0.75 \leq x \leq 1.02$ and $0.02 \leq p \leq 0.05$), and q in formula (2) satisfies the following relation: $0.01 \leq q \leq 0.15$). Yet more preferably, the amount of Pb substituted by Sr is 1 to 12 mol % (i.e., x and p in formula (2) satisfy the following relations: $0.73 \leq x \leq 1.02$ and $0.02 \leq p \leq 0.10$ (more preferably $0.78 \leq x \leq 1.02$ and $0.02 \leq p \leq 0.05$), and q in formula (2) satisfies the following relation: $0.01 \leq q \leq 0.12$). The amount of Ti substituted by Nb, etc. is more preferably 3 to 8 mol % (i.e., z in formula (1) or (2) satisfies the following relation: $0.03 \leq z \leq 0.08$). The Ni content is more preferably 0.50 to 1.0 wt. % as reduced to NiO. The Mn content is more preferably 0.01 to 0.2 wt. % as reduced to $MnO_2$.

When a dielectric emitter section is formed of the dielectric composition of the present invention containing the aforementioned components, deterioration of the emitter section due to repeated use thereof can be suppressed, as compared with the case of a dielectric emitter section of the conventional electron emitter. That is, an electron emitter including the emitter section formed of the dielectric composition exhibits enhanced durability. Therefore, when the dielectric composition according to the present invention is applied to an electron emitter, reduction of the electron emission quantity, which is attributed to repeated use of the electron emitter, can be suppressed.

The present invention also provides a dielectric film element comprising a dielectric layer formed of the aforementioned dielectric composition; a first electrode provided on the top surface of the dielectric layer; a second electrode provided on the top surface or the bottom surface of the dielectric layer; and a substrate which is provided on the bottom surface of the dielectric layer and which supports the dielectric layer, wherein, when a drive voltage is applied to the first and second electrodes, electrons are emitted from the top surface of the dielectric layer.

In the dielectric film element having the aforementioned configuration, preferably, the second electrode is bonded onto the surface of the substrate, and the dielectric layer is bonded onto the second electrode. Specifically, in this preferred configuration, the second electrode is bonded onto the surface of the substrate, the dielectric layer is bonded onto the second electrode, and the first electrode is bonded onto the top surface of the dielectric layer.

With this configuration, the area of the substrate required for forming a single electron emitter can be reduced, and the mounting density of electron emitters can be increased, as compared with the case where both the first and second electrodes are provided on the top surface of the dielectric layer. Therefore, particularly when this configuration is applied to to FEDs, high resolution is readily attained. In this configuration, the first electrode and the second electrode are respectively provided on different surfaces (more preferably, the top surface and the bottom surface) of the dielectric layer; i.e., the dielectric layer is provided between the first and second electrodes. Therefore, when a relatively high voltage is applied to these electrodes, electric discharge tends not to occur, as compared with the case where both the electrodes are provided on the top surface of the dielectric layer. Thus, the aforementioned configuration enables provision of an electron emitter which exhibits enhanced durability and increased electron emission quantity.

In the dielectric film element having the aforementioned configuration, the dielectric layer is preferably formed so as to have a thickness of 1 to 300 µm.

When the thickness of the dielectric layer is less than 1 µm, the number of defects in the dielectric layer increases, and the layer is insufficiently densified. Therefore, the electric field intensity at defects of the resultant electron emitter becomes higher than that at electron emission sites of the emitter, and thus favorable electron emission characteristics are difficult to attain. In the case where the first electrode and the second electrode are respectively provided on different surfaces (particularly on the top surface and the bottom surface) of the dielectric layer, when the thickness of the dielectric layer is less than 1 µm; i.e., the distance between these electrodes is excessively small, dielectric breakdown may occur under application of a drive voltage.

In contrast, when the thickness of the dielectric layer exceeds 300 µm, a large amount of stress is generated in the dielectric layer through application of a drive voltage. When such a large amount of stress is generated, in order to properly support the dielectric layer by the substrate, the thickness of the substrate must be increased. Thus, increasing the dielectric layer thickness leads to difficulty in miniaturizing and thinning an electron emitter, which is disadvantageous from the viewpoint of application of the electron emitter to a display (in particular, to FEDs). In the case where the first electrode and the second electrode are provided on different surfaces of the dielectric layer, when the thickness of the dielectric layer exceeds 300 µm, excessively high drive voltage must be applied for attaining an electric field intensity necessary for electron emission, and therefore, for example, a high-voltage-resistance drive IC is required, leading to an increase in production cost of an electron emitter.

The thickness of the dielectric layer is more preferably 5 to 100 µm, from the viewpoints of densification of the structure of the dielectric layer, prevention of dielectric breakdown, miniaturization and thinning of an electron emitter, reduction of drive voltage, enhancement of production yield, and attainment of reliable electron emission performance.

Preferably, the electron emitter employing the dielectric film element of the present invention is configured such that it can be operated as follows: in the first stage, a drive voltage is applied such that the first electrode becomes lower in electric potential than the second electrode, whereby electrons are emitted (supplied) from the first electrode toward the surface of the dielectric layer; i.e., electrons are accumulated (charged) on the surface of the dielectric layer; and in the second stage, a drive voltage is applied such that the first electrode becomes higher in electric potential than the second electrode, whereby the electrons accumulated on the surface of the dielectric layer are emitted. Such a configuration allows relatively easy control of the quantity of the charge on the surface of dielectric layer in the first stage, so that high electron emission quantity can be reliably attained with high controllability.

Particularly preferably, the dielectric film element is configured such that an opening is formed in the first electrode, and a portion of the top surface of the dielectric layer corresponding to the opening is exposed to the outside. With this configuration, the electron emission quantity of a single electron emitter is increased, and the opening can serve as a gate electrode or a focusing electron lens with respect to electrons emitted from the surface of the dielectric layer. Thus, this configuration can enhance rectilinearity of the emitted electrons. Therefore, when a plurality of electron emitters are arranged on a flat plane, crosstalk between adjacent electron emitters is reduced. Particularly when the electron emitter is applied to FEDs, the resolution of the FEDs is enhanced.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which.

DETAILED DESCRIPTION OF PREFERRED EMBODIMENTS

Preferred embodiments of the present invention will next be described with reference to the Tables and, if needed, the drawings.

<Schematic Description of FED Including Electron Emitter>

Figure 1:
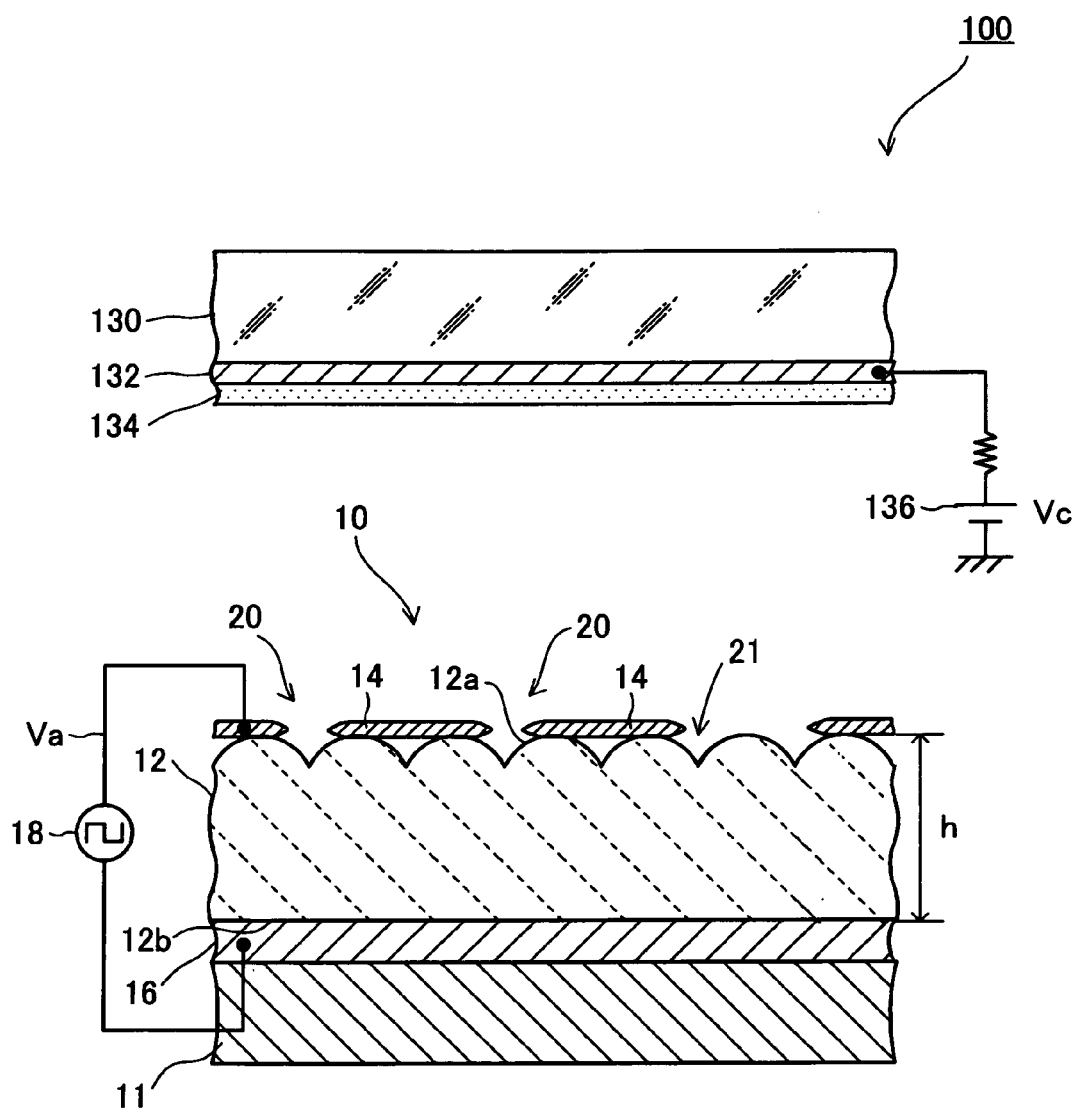
FIG. 1 is a fragmentary, cross-sectional view showing an electron emitter according to an embodiment of the present invention.

FIG. 1 is a partial cross-sectional view schematically showing a display (FED) 100 including an electron emitter 10, which is a dielectric film element formed of a dielectric composition according to the present invention.

The display 100 includes the electron emitter 10; a transparent plate 130 provided above the electron emitter 10; a collector electrode 132 formed on the lower surface of the transparent plate 130 (i.e., the surface facing the electron emitter 10); a phosphor layer 134 formed on the lower surface of the collector electrode 132 (i.e., the surface facing the electron emitter 10); a bias voltage source 136 which is connected via a resistor to the collector electrode 132; and a pulse generator 18 which is connected to the electron emitter 10.

The transparent plate 130 is formed of a glass plate or an acrylic plate. The collector electrode 132 is formed of a transparent electrode such as an ITO (indium tin oxide) thin film. The space between the electron emitter 10 and the phosphor layer 134 is a vacuum atmosphere having a predetermined vacuum level of, for example, $10^2$ to $10^{-6}$ Pa (more preferably $10^{-3}$ to $10^{-5}$ Pa). A collector voltage Vc is applied to the collector electrode 132 from the bias voltage source 136 via a predetermined resistor. The display 100 is configured such that electrons are emitted from the electron emitter 10 through an electric field generated through application of the collector voltage Vc, and the electrons fly toward the collector electrode 132 and collide with the phosphor layer 134, whereby light is emitted from predetermined pixel positions.

Numerous electron emitters 10 are two-dimensionally arrayed on a ceramic substrate 11. Each of the electron emitters 10 includes an emitter section 12; a first electrode 14 formed on a top surface 12a of the emitter section 12; and a second electrode 16 which is formed on the substrate 11 so as to be in contact with a bottom surface 12b of the emitter section 12. The first electrode 14 and the second electrode 16 are connected to the pulse generator 18 for applying a drive voltage Va to these electrodes. Notably, FIG. 1 shows one of the numerous electron emitters 10 which are two-dimensionally arrayed on the substrate 11, and a portion of the first electrode 14 of an electron emitter 10 adjacent to the emitter 10 of FIG. 1 is shown on the extreme right of FIG. 1.

The emitter section 12 is a dielectric layer formed of a polycrystalline material containing the dielectric composition employed in the present invention, and the thickness h of the emitter section is preferably 1 to 300 µm, more preferably 5 to 100 µm.

The first electrode 14 is formed of a metallic film, metallic particles, an electrically conductive non-metallic film (e.g., a carbon film or an electrically conductive non-metallic oxide film), or electrically conductive non-metallic particles (e.g., carbon particles or electrically conductive oxide particles). The first electrode 14 is formed on the top surface 12a through coating, vapor deposition, or a similar technique, so as to attain a thickness of 0.1 to 20 µm. The aforementioned metallic film or metallic particles are preferably formed of platinum, gold, silver, iridium, palladium, rhodium, molybdenum, tungsten, or an alloy thereof. The aforementioned electrically conductive non-metallic film or electrically conductive non-metallic particles are preferably formed of graphite, ITO (indium tin oxide), or LSCO (lanthanum strontium copper oxide). When the first electrode 14 is formed of metallic particles or electrically conductive non-metallic particles, preferably, the particles assume a scale-like, plate-like, foil-like, acicular, rod-like, or coil-like form.

The first electrode 14 has a plurality of openings 20. The openings 20 are formed such that the top surface 12a of the emitter section 12 is exposed to the exterior of the electron emitter 10 (i.e., the aforementioned vacuum atmosphere; the same shall apply hereinafter). The top surface 12a of the emitter section 12 is exposed to the exterior of the electron emitter 10 also at peripheral edge portions 21 of the first electrode 14. Preferably, the openings 20 are formed in the first electrode 14 such that the total of the areas of the openings 20 accounts for 5 to 80% of the entire surface area (including the total of the areas of the openings 20) of the emitter section 12 capable of contributing to electron emission. As used herein, "the entire surface area of the emitter section 12 capable of contributing to electron emission" corresponds to the sum of the area of the surface of the emitter section 12 exposed in the vicinity of the peripheral edge portions 21 of the first electrode 14 (i.e., the area of the surface of the emitter section 12 directly below the peripheral edge portions of the first electrode 14) and the total of the areas of the openings 20.

The second electrode 16 is formed of a metallic film so as to attain a thickness of preferably 20 µm or less (more preferably 5 µm or less). Similar to the case of the aforementioned first electrode, the second electrode 16 is formed on the substrates through coating, vapor deposition, or a similar technique.

Specifically, in the electron emitter 10, the second electrode 16 is bonded to the upper surface of the substrate 11; the emitter section 12 is bonded to the upper surface of the second electrode 16; and the first electrode 14 is provided on the top surface 12a of the emitter section 12. As used herein, the term "bonded" refers to the case where a component is joined directly and closely to another component without employment of an organic or inorganic adhesive.

As described below in detail, the electron emitter 10 is configured such that electrons supplied from the first electrode 14 are accumulated on the top surface 12a of the emitter section 12 corresponding to the openings 20 and the peripheral edge portions 21, and the thus-accumulated electrons are emitted toward the exterior of the electron emitter 10 (i.e., toward the phosphor layer 134).

<Detailed Description of Electron Emitter>

Figure 2:
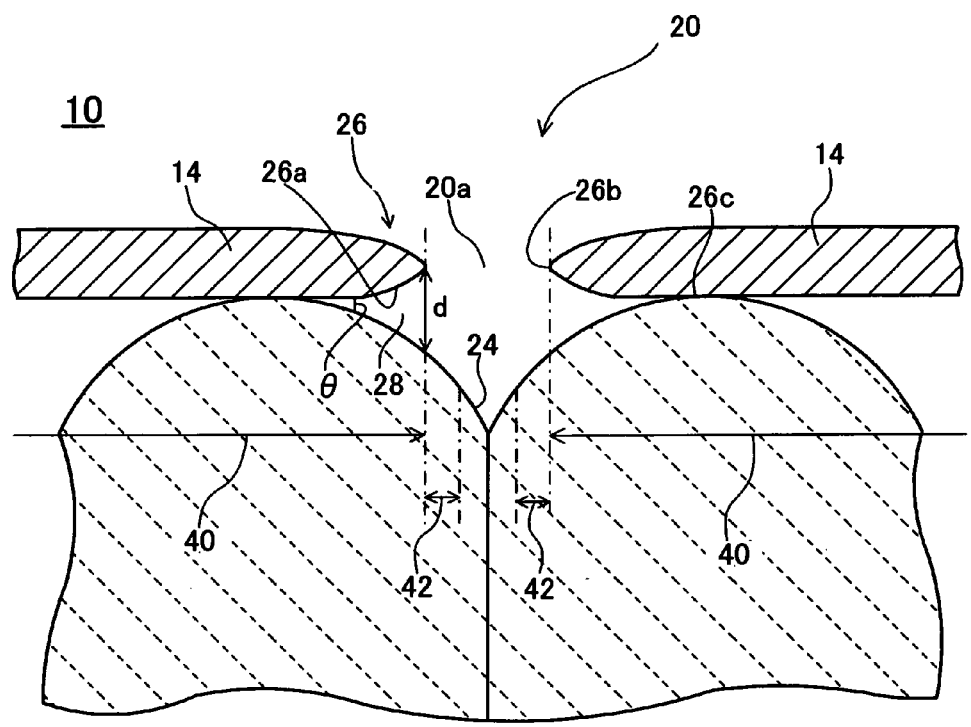
FIG. 2 is an enlarged cross-sectional view showing essential portions of the electron emitter.

FIG. 2 is an enlarged cross-sectional view showing essential portions of the electron emitter 10 of FIG. 1. As described above, the emitter section 12 is formed of a polycrystalline material. Therefore, as shown in FIGS. 1 and 2, microscopic concavities and convexities, which are attributed to grain boundaries, etc., are formed on the top surface 12a of the emitter section 12; specifically, concavities 24 are formed on the top surface 12a of the emitter section 12. The openings 20 of the first electrode 14 are formed in regions corresponding to the concavities 24. In the example illustrated in FIG. 1 or 2, the concavities 24 and the openings 20 are formed in one-to-one correspondence. However, in some cases, a single opening 20 may be formed for a plurality of concavities 24.

As shown in FIG. 2, each of the openings 20 includes a through hole 20a defined by the inner edge 26b of the opening 20, and a surrounding portion 26 (a portion of the first electrode 14) that surrounds the through hole 20a. The first electrode 14 is formed such that a surface 26a of the surrounding portion 26 of the opening 20 that faces the emitter section 12 is apart from the emitter section 12. In other words, a gap 28 is formed between the emitter section 12 and the surface 26a of the surrounding portion 26 of the opening 20, the surface 26a facing the emitter section 12. The cross section of the surrounding portion 26 of the opening 20 of the first electrode 14 assumes an overhanging form (flange form). Accordingly, in the subsequent description, the "surrounding portion 26 of the opening 20 of the first electrode 14" is called an "overhanging portion 26 of the first electrode 14." The "surface 26a of the surrounding portion 26 of the opening 20 of the first electrode 14 that faces the emitter section 12" is called a "lower surface 26a of the overhanging portion 26."

Also, in the electron emitter 10, the top surface 12a of the emitter section 12 (i.e., the surface in the vicinity of the vertexes of convexities), and the lower surface 26a of the overhanging portion 26 of the first electrode 14 form a maximum angle θ that satisfies the following relation: $1° \leq \theta \leq 60°$.

Also, in the electron emitter 10, the emitter section 12 and the first electrode 14 are formed such that the maximum gap d measured vertically between the top surface 12a of the emitter section 12 and the lower surface 26a of the overhanging portion 26 of the first electrode 14 is regulated so as to satisfy the following relation: $0\ \mu m < d \leq 10\ \mu m$, and that the surface roughness Ra (centerline average roughness, unit: μm) of the top surface 12a is regulated to 0.005 or more and 0.5 or less.

Then, triple junctions (formed by contact among the first electrode 14, the emitter section 12, and a vacuum) 26c are formed at contact sites among the top surface 12a of the emitter section 12, the first electrode 14, and a medium (e.g., a vacuum) surrounding the electron emitter 10. The triple junctions 26c are sites (electric field concentration points) at which lines of electric force concentrate (where electric field concentration occurs) when a drive voltage Va is applied between the first electrode 14 and the second electrode 16. As used herein, the expression "site at which lines of electric force concentrate" refers to a site at which lines of electric force that are generated from the second electrode 16 at even intervals concentrate, when the lines of electric force are drawn under the assumption that the first electrode 14, the emitter section 12, and the second electrode 16 are flat plates each having a cross section extending infinitely. The state of the concentration of lines of electric force (i.e., the state of electric field concentration) can be readily observed through simulation by means of numerical analysis employing the finite-element method.

Further, in the electron emitter 10, the openings 20 are shaped such that the inner edges 26b thereof serve as the aforementioned electric field concentration points. Specifically, the overhanging portion 26 of the opening 20 has such a cross-sectional shape as to be acutely pointed toward the inner edge 26b (the tip end of the overhanging portion 26); i.e., the thickness gradually decreases. The electric field concentration points, which are formed at the inner edge 26b of the opening 20 as described above, and the triple junctions 26c are also formed at sites corresponding to the peripheral edge portions 21 of the first electrode 14.

In this instance, the openings 20 may be formed to assume a variety of shapes as viewed in plane, including, a circular shape, an elliptical shape, a polygonal shape, and an irregular shape. The openings 20 are formed such that, when the through holes 20a as viewed in plane are approximated to circles having areas identical to those of the through holes 20a as viewed in plane, the average diameter of the circles (hereinafter may be referred to as "the average diameter of the through holes 20a") becomes 0.1 μm or more and 20 μm or less. The reason for this is described below.

As shown in FIG. 2, regions of the emitter section 12 where polarization is inverted or changes in accordance with the drive voltage Va are regions (first regions) 40 located just under the first electrode 14, and regions (second regions) 42 corresponding to regions of the openings 20 that extend from the inner edges 26b (inner peripheries) of the openings 20 toward the centers of the openings 20. Particularly, the range of the second region 42 varies depending on the level of the drive voltage Va and the degree of electric field concentration in the second region 42. In the electron emitter 10, when the average diameter of the through holes 20a falls within the above-described range (i.e., 0.1 μm or more and 20 μm or less), electrons are efficiently emitted in a sufficient quantity through the openings 20.

On the contrary, the area of the second regions 42 decreases when the average diameter of the through holes 20a is less than 0.1 μm. The second regions 42 form the primary regions of electron emission from the top surface 12a of the emitter section 12 of the accumulated electrons supplied from the first electrode 14. Therefore, a decrease in the area of the second regions 42 results in reduction of the quantity of electrons emitted. In contrast, when the average diameter of the through holes 20a exceeds 20 μm, the ratio of the second regions 42 to regions of the emitter section 12 exposed through the openings 20 (occupancy of the exposed regions) decreases, resulting in reduction of electron emission efficiency.

<Electron Emission Principle of Electron Emitter>

Figure 3:
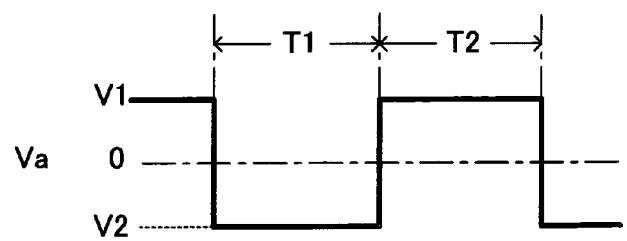
FIG. 3 is a diagram showing the waveform of a drive voltage to be applied to the electron emitter.
Figure 4:
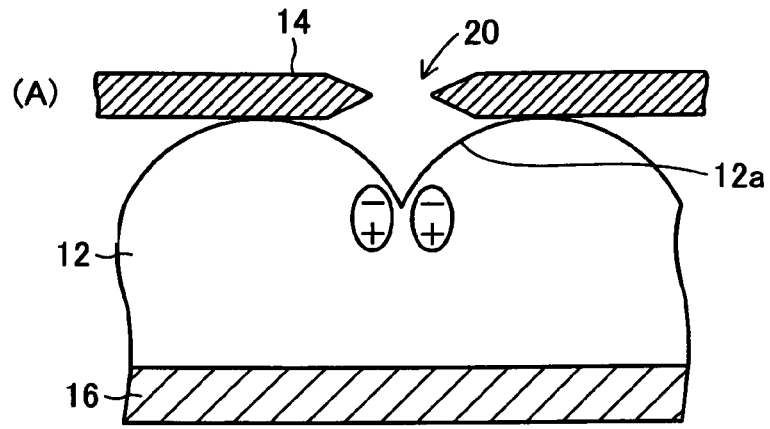
FIG. 4 is a set of explanatory views showing operation of the electron emitter.
Figure 4:
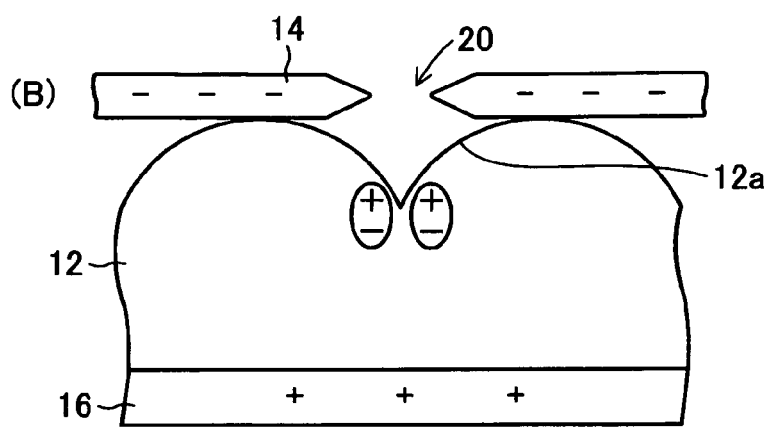
Figure 4:
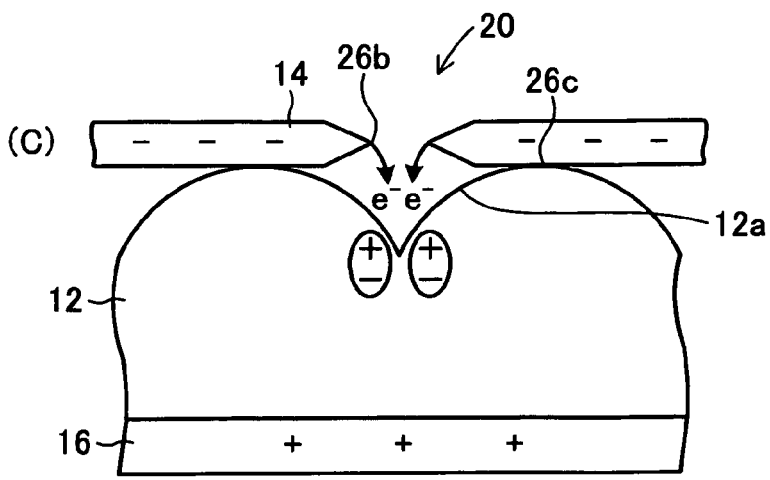
Figure 5:
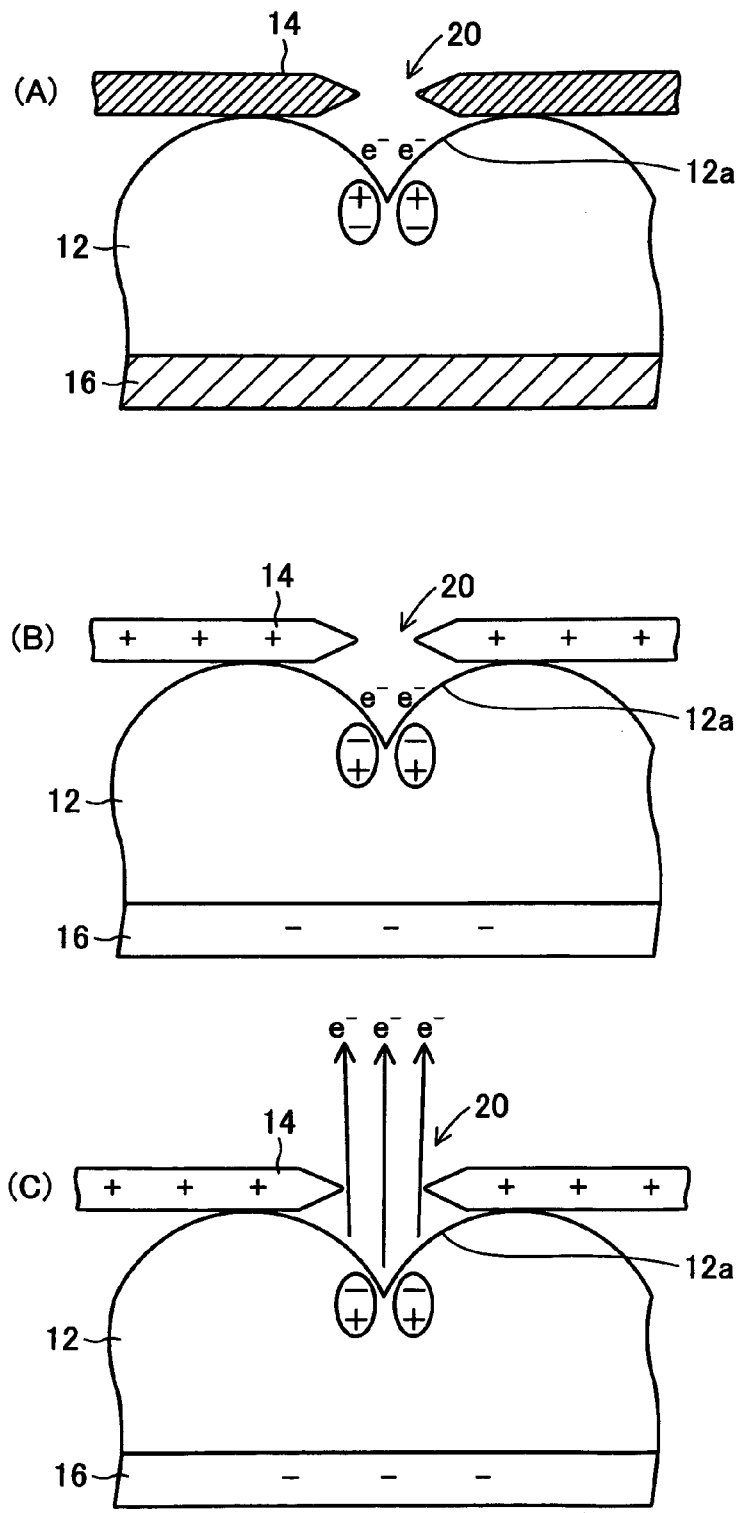
FIG. 5 is a set of explanatory views showing operation of the electron emitter.

Next, the principle of electron emission of the electron emitter 10 will be described with reference to FIGS. 3 to 5. In the electron emitter 10, as shown in FIG. 3, the drive voltage Va to be applied between the first electrode 14 and the second electrode 16 is an alternating voltage of rectangular waveform having a period of T1+T2. In the drive voltage Va, the reference voltage (voltage corresponding to the center of the wave) is 0 V; during time T1 corresponding to the first stage, the electric potential of the first electrode 14 is V2 (negative voltage), which is lower than the electric potential of the second electrode 16; and during time T2 corresponding to the second stage, the electric potential of the first electrode 14 is V1 (positive voltage), which is higher than the electric potential of the second electrode 16.

In the initial state, the emitter section 12 is polarized unidirectionally. In the subsequent description, it is assumed that the emitter section 12 is initialized such that the negative poles of dipoles face toward the top surface 12a of the emitter section 12 (see FIG. 4A).

Firstly, in the initial state in which the reference voltage is applied, as shown in FIG. 4A, the negative poles of dipoles face toward the top surface 12a of the emitter section 12, so that virtually no electrons are accumulated on the top surface 12a of the emitter section 12.

Subsequently, when the negative voltage V2 is applied, polarization is inverted (see FIG. 4B). This inversion of polarization causes electric field concentration to occur at the inner edge 26b and the triple junction 26c, which are the aforementioned electric field concentration points, so that electrons are emitted (supplied) from the electric field concentration points of the first electrode 14 toward the top surface 12a of the emitter section 12. Thus, electrons are accumulated, for example, in a region of the top surface 12a exposed through the opening 20 of the first electrode 14 and in a region of the top surface 12a in the vicinity of the overhanging portion 26 of the first electrode 14 (see FIG. 4C). In other words, the top surface 12a is charged. This charging can be continued until a predetermined saturated condition, which depends on the surface resistance of the emitter section 12, is attained. The quantity of the charge can be controlled on the basis of application time of a control voltage. Thus, the first electrode 14 (particularly the aforementioned electric field concentration points) functions as an electron supply source for the emitter section 12 (top surface 12a).

Subsequently, when the drive voltage Va is changed from the negative voltage V2 to the reference voltage as shown in FIG. 5A, and then the positive voltage V1 is applied, polarization is re-inverted (see FIG. 5B). As a result, Coulomb repulsion induced by the negative poles of dipoles causes the accumulated electrons to be emitted from the top surface 12a toward the exterior of the electron emitter 10 through the through hole 20a (see FIG. 5C).

In a manner similar to that described above, electrons are emitted from the peripheral edge portions 21 of the first electrode 14 at which the openings 20 are not present.

<Equivalent Circuit of Electron Emitter>

Figure 6:
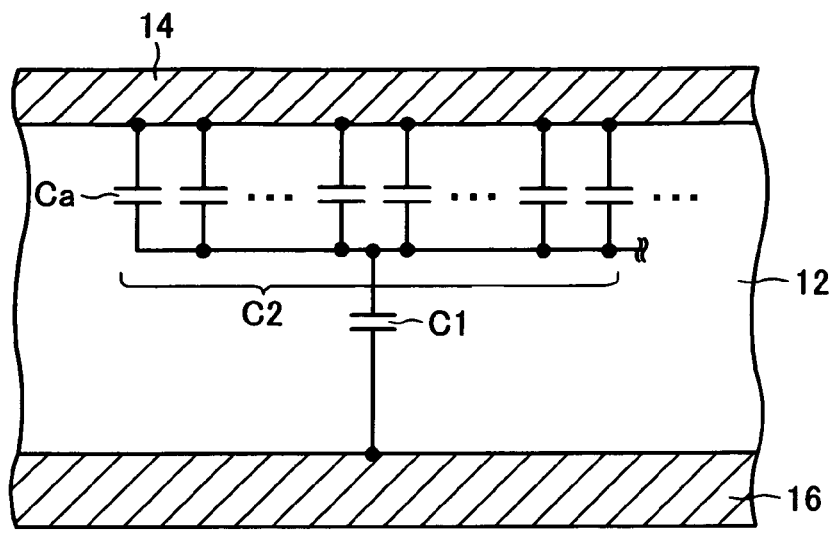
FIG. 6 is an equivalent circuit diagram for explaining influence of a gap between a first electrode and an emitter section on an electric field between the first electrode and a second electrode.

As shown in FIG. 6, the electron emitter 10 according to the first embodiment has in its electrical operation a capacitor C1 due to the emitter section 12 and a cluster of capacitors Ca due to respective gaps 28, disposed between the first electrode 14 and the second electrode 16. The capacitors Ca due to the respective gaps 28 are connected parallel to each other into a single capacitor C2. In terms of an equivalent circuit, the capacitor C1 due to the emitter section 12 is connected in series to the capacitor C2 which comprises the cluster of capacitors Ca.

Actuality, the capacitor C1 due to the emitter section 12 is not directly connected in series to the capacitor C2 which comprises the cluster of capacitors Ca, but the capacitive component that is connected in series varies depending on the number of the openings 20 formed in the first electrode 14 and the overall area of the openings 20.

Figure 7:
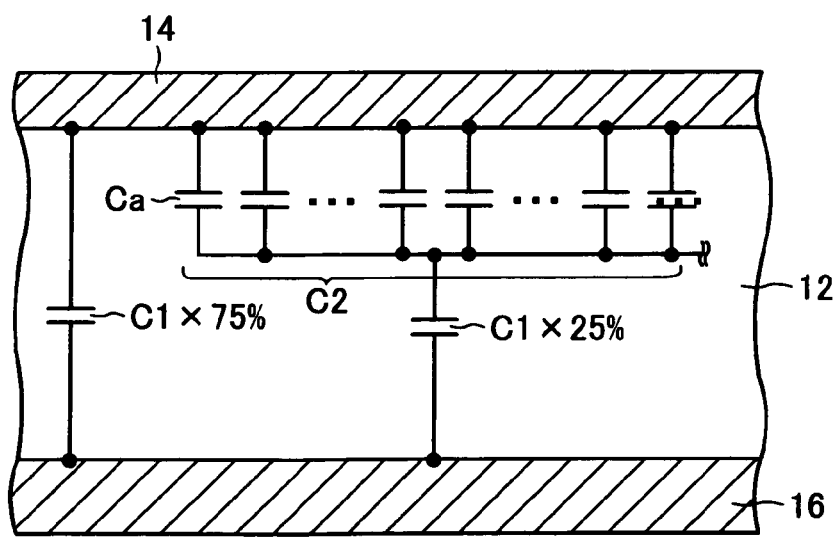
FIG. 7 is an equivalent circuit diagram for explaining influence of the gap between the first electrode and the emitter section on the electric field between the first electrode and the second electrode.

Capacitance calculations will be performed on the assumption that 25% of the capacitor C1 due to the emitter section 12 is connected in series to the capacitor C2 which comprises the cluster of capacitors Ca, as shown in FIG. 7. Since the gaps 28 are in a vacuum, their relative dielectric constant thereof is 1. It is assumed that the maximum distance d across the gaps 28 is 0.1 µm, the area S of each gap 28 is S=1 µm×1 µm, and the number of the gaps 28 is 10,000. It is also assumed that the emitter section 12 has a relative dielectric constant of 2000, the emitter section 12 has a thickness of 20 µm, and the confronting area of the first and second electrode 14, 16 is 200 µm×200 µm. The capacitor C2 which comprises the cluster of capacitors Ca has a capacitance of 0.885 pF, and the capacitor C1 due to the emitter section 12 has a capacitance of 35.4 pF. If the portion of the capacitor C1 due to the emitter section 12 which is connected in series to the capacitor C2 which comprises the cluster of capacitors Ca is 25% of the entire capacitor C1, then that series-connected portion has a capacitance (including the capacitance of capacitor C2 which comprises the cluster of capacitors Ca) of 0.805 pF, and the remaining portion has a capacitance of 26.6 pF.

Because the series-connected portion and the remaining portion are connected in parallel to each other, the overall capacitance is 27.5 pF. This capacitance is 78% of the capacitance 35.4 pF of the capacitor C1 due to the emitter section 12. Therefore, the overall capacitance is smaller than the capacitance of the capacitor C1 due to the emitter section 12.

Consequently, the capacitance of the cluster of capacitors Ca due to the gaps 28 is relatively small. Because of the voltage division between the cluster of capacitors Ca and the capacitor C1 due to the emitter section 12, almost the entire applied voltage Va is applied across the gaps 28, which are effective to produce a larger output of the electron emission.

Since the capacitor C2 which comprises the cluster of capacitors Ca is connected in series to the capacitor C1 due to the emitter section 12, the overall capacitance is smaller than the capacitance of the capacitor C1 due to the emitter section 12. This is effective to provide preferred characteristics, namely, the electron emission is performed for a larger output and the overall power consumption is lower.

<Description of Dielectric Composition of First Embodiment>

Specifically, the emitter section 12 employed in the first embodiment is formed from a dielectric composition containing, as a primary component, a composition represented by the following formula (1), and containing NiO in a predetermined amount.

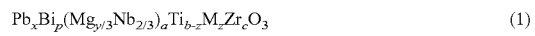

$$Pb_xBi_p(Mg_{y/3}Nb_{2/3})_aTi_{b-z}M_zZr_cO_3 \qquad (1)$$

[wherein x, p, and z satisfy the following relations: $0.85 \leq x \leq 1.03$, $0.02 \leq p \leq 0.1$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W].

When this dielectric composition is employed, the dielectric layer forming the emitter section 12 can be densified, and electron emission characteristics can be improved. Specifically, when the dielectric layer forming the emitter section 12 is densified, the number of defects in the dielectric layer is reduced, and therefore, during application of the drive voltage Va, the electric field intensity at the aforementioned gaps 28 is enhanced, resulting in an increase in the electron emission quantity. In addition, even when the electron emitter 10 is repeatedly used for a long period of time, deterioration of the electron emission performance of the emitter section 12 is suppressed; i.e., the electron emitter 10 exhibits enhanced durability.

In contrast, as described below in the Examples and the Comparative Examples, when a, b, and c in formula (1), the Pb or Ti substitution amount, or the NiO content falls outside the aforementioned specific range, the electron emission performance of the emitter section 12 is considerably deteriorated when the electron emitter is repeatedly used.

When the NiO content is very low (i.e., less than 0.05%), the dielectric layer is insufficiently densified, and the electron emission performance is deteriorated. Specifically, the number of defects (e.g., pores) increases in the dielectric layer forming the emitter section 12, and electric field concentration occurs at such defects, which have lower dielectric constant, whereby the electric field intensity decreases at the electron emission sites corresponding to the gaps 28, resulting in reduction of the electron emission quantity.

From the viewpoint of suppression of deterioration of the emitter section 12 due to repeated use, in the aforementioned ranges specified by the present invention, the amount of Pb substituted by Bi is more preferably 2 to 5 mol %, the amount of Ti substituted by Nb, etc. is more preferably 3 to 8 mol %, and the NiO content is more preferably 0.50 to 1.0 wt. %.

<Production Method for Electron Emitter>

Firstly, on a substrate 11 formed of $Y_2O_3$-stabilized $ZrO_2$, a second electrode 16 containing Pt and having predetermined dimensions and shape and a thickness of 3 µm is formed through screen printing. Subsequently, the substrates having the thus-formed second electrode 16 is heated at about 1,000 to about 1400° C., to thereby bond and combine the second electrode 16 with the substrates.

Subsequently, a dielectric composition containing, as a primary component, a composition represented by formula (1) and containing NiO in a predetermined amount (mass %)

is applied onto the second electrode 16 through screen printing, so as to form a thick layer having a thickness of 40 μm.

In this instance, examples of the raw materials for the dielectric composition which may be employed include oxides of Pb, Mg, Nb, Zr, Ti, Ni, etc. (e.g., PbO, $Pb_3O_4$, MgO, $Nb_2O_5$, $TiO_2$, $ZrO_2$, and NiO etc.); carbonates of these elements; compounds containing two or more species of these elements (e.g., $MgNb_2O$); these metallic elements per se; and alloys of these elements. These raw materials may be employed singly or in combination of two or more species.

No particular limitation is imposed on the preparation method for the dielectric composition, and the composition may be prepared through, for example, the following procedure.

Firstly, the aforementioned raw materials are mixed together such that the corresponding elements are contained in predetermined amounts. Subsequently, the resultant raw material mixture is heated at 750° to 1,300° C., to thereby yield a dielectric composition. When the dielectric composition obtained through heating is subjected to X-ray diffractometry, the ratio of the intensity of the strongest diffraction line of a phase other than a perovskite phase (e.g., a pyrochlore phase) to that of the strongest diffraction line of a perovskite phase is preferably 5% or less, more preferably 2% or less. Finally, the dielectric composition obtained through heating is milled by use of, for example, a ball mill, to thereby prepare dielectric composition powder particles having a predetermined particle size (e.g., an average particle size of 0.1 to 1 μm as measured by means of laser diffractometry).

The thus-prepared dielectric composition powder particles are dispersed in a predetermined binder, to thereby prepare a paste. The paste is applied onto the second electrode 16 through screen printing as described above, to thereby form a thick layer.

The thus-formed dielectric composition layer is heated, to thereby evaporate the binder and density the dielectric layer. Through this procedure, the emitter section 12 is formed.

Subsequently, a Pt-resinate-containing precursor is applied onto the above-formed emitter section 12 through screen printing, followed by heat treatment, to thereby form a first electrode (Pt electrode) 14. Thus, the electron emitter 10 of dielectric film type is produced.

EXAMPLES

As described below, in Examples 1 through 8 and Comparative Examples 1 through 9, dielectric-film-type electron emitters were produced through the aforementioned production method. In each of these Examples and Comparative Examples, a display as shown in FIG. 1 was manufactured from the above-produced electron emitter, and the electron emitter was evaluated on the basis of the degree of reduction of brightness of the display after repeated use thereof. Specifically, the initial brightness of the display was measured; the display was subjected to durability testing (i.e., $10^9$ cycles of electron emission operation); the brightness of the display after this durability testing (hereinafter may be referred to simply as "post-durability-test brightness") was measured; and the ratio of the post-durability-test brightness to the initial brightness (takes as 100%) was obtained. Each of the heated emitter sections 12 was found to have a thickness of 24 μm.

Example 1

In Example 1, there was employed a dielectric composition containing, as a primary component, $Pb_{0.96}Bi_{0.04}$ $(Mg_{1/3}Nb_{2/3})_{0.20}Ti_{0.38}Nb_{0.05}Zr_{0.37}O_3$ and containing NiO in an amount of 1.0 mass %. Meanwhile, in each of Comparative Examples 1 through 3, there was employed a dielectric composition in which a, b, and c in formula (1) are changed so as to fall outside the scope of the present invention; i.e., a dielectric composition in which the Bi content, the Nb content, and the NiO content are the same as those of the dielectric composition employed in Example 1, and the $(Mg_{1/3}Nb_{2/3})$ content, the Ti content, and the Zr content are changed so as to fall outside the scope of the present invention. The results are shown in Table 1.

TABLE 1

| | Bi content (mol %) | (Mg, Nb) content (mol %) | Ti content (mol %) | Zr content (mol %) | Nb content (mol %) | NiO content (wt. %) | Post-durability-test brightness |
|---|---|---|---|---|---|---|---|
| Ex. 1 | 4 | 20 | 38 | 37 | 5 | 1.00 | 77% |
| Comp. Ex. 1 | 4 | 60 | 25 | 10 | 5 | 1.00 | 19% |
| Comp. Ex. 2 | 4 | 30 | 50 | 15 | 5 | 1.00 | 33% |
| Comp. Ex. 3 | 4 | 0 | 45 | 50 | 5 | 1.00 | 22% |

As is clear from the results shown in Table 1, in the case of Example 1, in which the $(Mg_{1/3}Nb_{2/3})$ content, the Ti content, and the Zr content fall within the scope of the present invention, the post-durability-test brightness is 77%. In contrast, in the cases of Comparative Examples 1 through 3, the post-durability-test brightness is a half or less that in the case of Example 1.

Examples 2 and 3

In each of Examples 2 and 3 and Comparative Examples 4 and 5, there was employed a dielectric composition in which the $(Mg_{1/3}Nb_{2/3})$ content, the Ti content, the Zr content, the Nb content, and the NiO content are the same as those of the dielectric composition employed in Example 1, and the Bi content is changed. The results are shown in Table 2.

TABLE 2

| | Bi content (mol %) | (Mg, Nb) content (mol %) | Ti content (mol %) | Zr content (mol %) | Nb content (mol %) | NiO content (wt. %) | Post-durability-test brightness |
|---|---|---|---|---|---|---|---|
| Comp. Ex. 4 | 1 | 20 | 38 | 37 | 5 | 1.00 | 25% |
| Ex. 2 | 2 | 20 | 38 | 37 | 5 | 1.00 | 73% |
| Ex. 1 | 4 | 20 | 38 | 37 | 5 | 1.00 | 77% |
| Ex. 3 | 8 | 20 | 38 | 37 | 5 | 1.00 | 59% |
| Comp. Ex. 5 | 12 | 20 | 38 | 37 | 5 | 1.00 | 38% |

As is clear from the results shown in Table 2, in the cases of Examples 1 through 3, in which the Bi content falls within the scope of the present invention, the post-durability-test brightness is about 60% or more. In contrast, in the cases of Comparative Examples 4 and 5, in which the Bi content falls outside the scope of the present invention, the post-durability-test brightness is less than 40%. Particularly when the amount of Pb substituted by Bi falls within a range of 2 to 5 mol %, the post-durability-test brightness is envisaged to become 70% or more. In the cases of Examples 1 and 2, in which the Pb substitution amount is 2 to 4 mol %, very high post-durability-test brightness is attained.

Examples 4 and 5

In each of Examples 4 and 5 and Comparative Examples 6 and 7, there was employed a dielectric composition in which the $(Mg_{1/3}Nb_{2/3})$ content, the Ti content, the Zr content, the Bi content, and the NiO content are the same as those of the dielectric composition employed in Example 1, and the Nb content is changed. The results are shown in Table 3.

TABLE 3

| | Bi content (mol %) | (Mg, Nb) content (mol %) | Ti content (mol %) | Zr content (mol %) | Nb content (mol %) | NiO content (wt. %) | Post-durability-test brightness |
|---|---|---|---|---|---|---|---|
| Comp. Ex. 6 | 4 | 20 | 42 | 37 | 1 | 1.00 | 47% |
| Ex. 4 | 4 | 20 | 41 | 37 | 2 | 1.00 | 66% |
| Ex. 1 | 4 | 20 | 38 | 37 | 5 | 1.00 | 77% |
| Ex. 5 | 4 | 20 | 35 | 37 | 8 | 1.00 | 70% |
| Comp. Ex. 7 | 4 | 20 | 33 | 37 | 12 | 1.00 | 44% |

As is clear from the results shown in Table 3, in the cases of Examples 1, 4, and 5, in which the Nb content falls within the scope of the present invention, the post-durability-test brightness exceeds 60%. In contrast, in the cases of Comparative Examples 6 and 7, in which the Nb content falls outside the scope of the present invention, the post-durability-test brightness is less than 50%. Particularly when the amount of Ti substituted by Nb falls within a range of 3 to 8 mol %, the post-durability-test brightness is envisaged to become 70% or more. In the cases of Examples 1 and 5, in which the Ti substitution amount is 5 to 8 mol %, very high post-durability-test brightness is attained.

Examples 6 Through 8

In each of Examples 6 through 8 and Comparative Examples 8 and 9, there was employed a dielectric compositions in which the $(Mg_{1/3}Nb_{2/3})$ content, the Ti content, the Zr content, the Bi content, and the Nb content are the same as those of the dielectric composition employed in Example 1, and the NiO content is changed. The results are shown in Table 4.

TABLE 4

| | Bi content (mol %) | (Mg, Nb) content (mol %) | Ti content (mol %) | Zr content (mol %) | Nb content (mol %) | NiO content (wt. %) | Post-durability-test brightness |
|---|---|---|---|---|---|---|---|
| Comp. Ex. 8 | 4 | 20 | 38 | 37 | 5 | 0.00 | 38% |
| Ex. 6 | 4 | 20 | 38 | 37 | 5 | 0.10 | 55% |
| Ex. 7 | 4 | 20 | 38 | 37 | 5 | 0.50 | 69% |
| Ex. 1 | 4 | 20 | 38 | 37 | 5 | 1.00 | 77% |
| Ex. 8 | 4 | 20 | 38 | 37 | 5 | 2.00 | 58% |
| Comp. Ex. 9 | 4 | 20 | 38 | 37 | 5 | 3.00 | 24% |

As is clear from the results shown in Table 4, in the cases of Examples 1, 6, 7, and 8, in which the NiO content falls within the scope of the present invention, the post-durability-test brightness is 55% or more. In contrast, in the cases of Comparative Examples 8 and 9, in which the NiO content falls outside the scope of the present invention, the post-durability-test brightness is less than 40%. Particularly, in the cases of Examples 1 and 7, in which the NiO content falls within a range of 0.50 to 1.0 wt. %, the post-durability-test brightness is very high (about 70% or more).

Examples 9 Through 11

In Example 9, 10, or 11, the element corresponding to M in formula (1) was changed from Nb to Ta, Mo, or W, respectively. In each of these Examples, high post-durability-test brightness was attained. The results are shown in Table 5.

TABLE 5

| | Bi content (mol %) | (Mg, Nb) content (mol %) | Ti content (mol %) | Zr content (mol %) | Ti substitution element | Ti substitution element content (mol %) | NiO content (wt. %) | Post-durability-test brightness |
|---|---|---|---|---|---|---|---|---|
| Ex. 1 | 4 | 20 | 38 | 37 | Nb | 5 | 1.00 | 77% |
| Ex. 9 | 4 | 20 | 38 | 37 | Ta | 5 | 1.00 | 71% |
| Ex. 10 | 4 | 20 | 40 | 37 | Mo | 3 | 1.00 | 63% |
| Ex. 11 | 4 | 20 | 40 | 37 | W | 3 | 1.00 | 65% |

As described above, a clear difference is observed in post-durability-test brightness between the case of Example 1, which falls within the scope of the present invention, and the case of Comparative Example 1, which falls outside the scope of the present invention; and the electron emitters of the Examples, which are invention products, exhibit good durability. Particularly, in the case of Example 1, which employs the dielectric composition containing, as a primary component, $Pb_{0.96}Bi_{0.04}(Mg_{1/3}Nb_{2/3})_{0.20}Ti_{0.38}Nb_{0.05}Zr_{0.37}O_3$, and containing NiO in an amount of 1.0 mass %, or in the case where the amount of Pb substituted by Bi is 2 to 5 mol %, the amount of Ti substituted by Nb, etc. is 3 to 8 mol %, and the NiO content is 0.50 to 1.0 wt. %, the postdurability-test brightness becomes very high (70% or more), which is remarkably preferable.

<Description of Dielectric Composition of Second Embodiment>

The emitted section 12 employed in the second embodiment is formed from a dielectric composition containing, as a primary component, a composition represented by formula (1), and containing NiO and $MnO_2$ in predetermined amounts. That is, the dielectric composition forming the emitter section 12 according to the second embodiment contains the dielectric composition employed in the first embodiment, and contains Mn ($MnO_2$) in a predetermined amount. The emitter section 12 and the electron emitter 10 including the emitter section 12 can be produced in a manner similar to that described above in the first embodiment.

Examples 12 Through 14

In a manner similar to that described above in the first embodiment, a display as shown in FIG. 1 was manufactured from the emitter section 12 according to the second embodiment, and the electron emitter 10 was evaluated on the basis of the degree of reduction of brightness of the display after repeated use. Specifically, the electron emitters of Examples 12 through 14, which contain $MnO_2$ in different amounts, were compared with the electron emitter of Example 1, which contains no $MnO_2$. The results are shown in Table 6.

lowing formula (2), and containing NiO in a predetermined amount (as in the cases of the aforementioned embodiments) (note: the dielectric composition is the aforementioned second dielectric composition).

$$Pb_xBi_pSr_q(Mg_{y/3}Nb_{2/3})_aTi_{b-z}M_zZr_cO_3 \qquad (2)$$

[wherein x, p, q, and y satisfy the following relations: $0.70 \leq x \leq 1.01$, $0.02 \leq p \leq 0.1$, $0.02 \leq q \leq 0.150$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W].

Examples 15 Through 17

The dielectric composition forming the emitter section 12 according to the third embodiment is obtained by partially substituting Pb of the dielectric composition employed in the

TABLE 6

| | Bi content (mol %) | (Mg, Nb) content (mol %) | Ti content (mol %) | Zr content (mol %) | Ti substitution element | Ti substitution element content (mol %) | NiO content (wt. %) | $MnO_2$ content (wt. %) | Post-durability-test brightness |
|---|---|---|---|---|---|---|---|---|---|
| Ex. 1 | 4 | 20 | 38 | 37 | Nb | 5 | 1.00 | 0 | 77% |
| Ex. 12 | 4 | 20 | 38 | 37 | Nb | 5 | 1.00 | 0.05 | 78% |
| Ex. 13 | 4 | 20 | 38 | 37 | Nb | 5 | 1.00 | 0.2 | 76% |
| Ex. 14 | 4 | 20 | 38 | 37 | Nb | 5 | 1.00 | 1.00 | 69% |

As is clear from the result shown in Table 6, the post-durability-test brightness is high in the cases of Example 12 ($MnO_2$ content: 0.05 wt. %), Example 13 ($MnO_2$ content: 0.2 wt. %), and Example 14 ($MnO_2$ content: 1.0 wt. %). Particularly, in the cases of Examples 12 and 13, in which the $MnO_2$ content falls within a range of 0.01 to 0.2 wt. %, the post-durability-test brightness is very high (75% or more).

first embodiment by Sr in a predetermined amount. The emitter section 12 and the electron emitter 10 including the emitter section 12 can be produced in a manner similar to that of the above-described embodiments. In the third embodiment, the electron emitter was evaluated in a manner similar to that described above. The results are shown in Table 7.

TABLE 7

| | Bi content (mol %) | Sr content (mol %) | (Mg, Nb) content (mol %) | Ti content (mol %) | Zr content (mol %) | Ti substitution element | Ti substitution element content (mol %) | NiO content (wt. %) | Post-durability-test brightness |
|---|---|---|---|---|---|---|---|---|---|
| Ex. 1 | 4 | 0 | 20 | 38 | 37 | Nb | 5 | 1.00 | 77% |
| Ex. 15 | 4 | 2 | 20 | 38 | 37 | Nb | 5 | 1.00 | 80% |
| Ex. 16 | 4 | 10 | 20 | 38 | 37 | Nb | 5 | 1.00 | 79% |
| Ex. 17 | 4 | 20 | 20 | 38 | 37 | Nb | 5 | 1.00 | 72% |

<Description of Dielectric Composition of Third Embodiment>

The emitter section 12 employed in the third embodiment is formed from a dielectric composition containing, as a primary component, a composition represented by the fol- As is clear from the results shown in Table 7, the post-durability-test brightness is high in the cases of Example 15 (amount of Pb substituted by Sr: 2 mol %), Example 16 (amount of Pb substituted by Sr: 10 mol %), and Example 17 (amount of Pb substituted by Sr: 20 mol %).

Particularly, when the Pb substitution amount falls within a range of 1 to 15 mol %, the post-durability-test brightness is envisaged to become 75% or more. In the cases of Examples 15 and 16, in which the Pb substitution amount falls within a range of 1 to 12 mol %, the post-durability-test brightness is very high (about 80%).

<Suggestion of Some Modifications>

The present invention is not limited to the above-described embodiments and Examples, and appropriate modifications of the invention may be made so long as the essentials of the present invention are not changed. Modifications of the present invention will next be described, but the invention is not limited to the following modifications.

Addition of Ni may be performed through any technique, so long as the Ni content (as reduced to NiO) falls within the aforementioned range. For example, there may be employed a technique in which NiO is added to a dielectric composition which has been prepared in advance. Preferably, the thus-added Ni (NiO) is uniformly dispersed in the emitter section 12. However, the Ni (NiO) may be dispersed in the emitter section 12 such that the Ni (NiO) concentration increases in a thickness direction of the emitter section 12 from the bottom surface 12b (which is bonded to the substrate 11) toward the top surface 12a.

The dielectric composition forming the emitter section 12 may be prepared through a variety of techniques other than the technique described above in the Examples. For example, the dielectric composition may be prepared through the alkoxide method or the coprecipitation method. Although heating is preferably performed after formation of the first electrode 14 or the second electrode 16, the heating is not necessarily carried out. However, in order to bond and combine the second electrode 16 with the substrate 11, preferably, heating is performed after the second electrode 16 is formed on the substrate 11 as described above the Examples.

The configuration of the dielectric film element of the present invention is not limited to that of the electron emitter described above in the embodiments. For example, both the first electrode 14 and the second electrode 16 may be formed on the top surface 12a of the electron emitter 12, although, in the aforementioned embodiments, the first electrode 14 and the second electrode 16 are respectively formed on the top surface 12a and the bottom surface 12b of the emitter section 12. The dielectric film element may have the multi-layer configuration; the first electrodes 14, the emitter sections 12, and the second electrodes 16 may be layered to form the multi-layer configuration.

The substrate 11 may be formed of a glass or metallic material in place of a ceramic material. No particular limitation is imposed on the type of the ceramic material to be employed. However, from the viewpoints of heat resistance, chemical stability, and insulating property, the substrates is preferably formed of a ceramic material containing at least one species selected from the group consisting of stabilized zirconium oxide, aluminum oxide, magnesium oxide, mullite, aluminum nitride, silicon nitride, and glass. More preferably, the substrates is formed of stabilized zirconium oxide, from the viewpoints of high mechanical strength and excellent toughness.

As used herein, the term "stabilized zirconium oxide" refers to zirconium oxide in which crystal phase transition is suppressed through addition of a stabilizer, The stabilized zirconium oxide encompasses partially stabilized zirconium oxide. Examples of the stabilized zirconium oxide include zirconium oxide containing a stabilizer (e.g., calcium oxide, magnesium oxide, yttrium oxide, scandium oxide, ytterbium oxide, cerium oxide, or an oxide of a rare earth metal) in an amount of 1 to 30 mol %. From the viewpoint of further enhancement of the mechanical strength of the substrate, zirconium oxide containing yttrium oxide as a stabilizer is preferably employed. In this case, the yttrium oxide content is preferably 5 to 6 mol %, more preferably 2 to 4 mol %. Zirconium oxide containing, in addition to yttrium oxide, aluminum oxide in an amount of 0.1 to 5 mol % is more preferred.

The stabilized zirconium oxide may have, for example, a cubic-monoclinic mixed crystal phase, a tetragonal-monoclinic mixed crystal phase, or a cubic-tetragonal-monoclinic mixed crystal phase. From the viewpoints of strength, toughness, and durability, the stabilized zirconium oxide preferably has, as a primary crystal phase, a tetragonal crystal phase or a tetragonal-cubic mixed crystal phase.

The first electrode 14 or the second electrode 16 may be formed of an electrically conductive material (e.g., metallic particles, metallic film, or electrically conductive non-metallic film) other than electrically conductive non-metallic particles. Examples of the metal which may be employed include at least one metal selected from the group consisting of platinum, palladium, rhodium, gold, silver, and an alloy thereof. Particularly, from the viewpoint that high heat resistance is required during heating of a piezoelectric/electrostrictive section, platinum or an alloy predominantly containing platinum is preferably employed. Alternatively, from the viewpoint of low cost and high heat resistance, a silver-palladium alloy is preferably employed.

The openings 20 of the first electrode 14 may assume a variety of shapes other than the shapes described above in the embodiments. Specifically, the overhanging portion 26 corresponding to each of the openings 20, at which lines of electric force concentrate, may have a cross-sectional shape such that the thickness of the first electrode 14 gradually decreases toward the inner edge 26b; for example, a cross-sectional shape as shown in FIG. 2, in which the overhanging portion 26 is acutely pointed toward the center (in a thickness direction) of the first electrode 14, or a cross-sectional shape in which the overhanging portion 26 is acutely pointed toward the bottom surface of the first electrode 14. The aforementioned shape of the opening 20 may be attained by providing a projection having a sharp cross section to the inner wall of the opening, or by depositing electrically conductive fine particles onto the inner wall thereof. Alternatively, the aforementioned shape of the opening 20 may be attained by imparting a hyperboloidal profile (particularly a hyperboloidal profile such that the cross section of the opening 20 has a sharp upper end and a sharp lower end at the inner edge of the opening 20) to the inner wall of the opening 20.

What is claimed is:

1. A dielectric composition comprising, as a primary component, a composition represented by the following formula (1):

$$Pb_xBi_p(Mg_{y/3}Nb_{2/3})_aTi_{b-z}M_zZr_cO_3 \qquad (1)$$

(wherein x, p, and y satisfy the following relations: $0.85 \leq x \leq 1.03$, $0.02 \leq p \leq 0.1$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W, which dielectric composition contains Ni in an amount of 0.05 to 2.0 wt. % as reduced to NiO).

2. A dielectric composition as described in claim 1, which further contains Mn in an amount of 0.05 to 1.0 wt. % as reduced to $MnO_2$.

3. A dielectric composition comprising, as a primary component, a composition represented by the following formula (2):

$$Pb_xBi_pSr_q(Mg_{y/3}Nb_{2/3})_aTi_{b-z}M_zZr_cO_3 \quad (2)$$

(wherein x, p, q, and y satisfy the following relations: $0.65 \leq x \leq 1.01$, $0.02 \leq p \leq 0.1$, $0.02 \leq q \leq 0.20$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W, which dielectric composition contains Ni in an amount of 0.05 to 2.0 wt. % as reduced to NiO).

4. A dielectric composition as described in claim 3, which further contains Mn in an amount of 0.05 to 1.0 wt. % as reduced to $MnO_2$.

5. A dielectric film element comprising
a dielectric layer formed of a dielectric composition, the dielectric composition comprising, as a primary component, a composition represented by the following formula (1):

$$Pb_xBi_p(Mg_{y/3}Nb_{2/3})_aTi_{b-z}M_zZr_cO_3 \quad (1)$$

(wherein x, p, and y satisfy the following relations: $0.85 \leq x \leq 1.03$, $0.02 \leq p \leq 0.1$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W, which dielectric composition contains Ni in an amount of 0.05 to 2.0 wt. % as reduced to NiO);
a first electrode provided on the obverse surface of the dielectric layer;
a second electrode provided on the obverse surface or the reverse surface of the dielectric layer; and
a substrate which is provided on the reverse surface of the dielectric layer and which supports the dielectric layer, wherein, when a drive voltage is applied to the first and second electrodes, electrons are emitted from the obverse surface of the dielectric layer.

6. A dielectric film element as described in claim 5, wherein the dielectric composition further contains Mn in an amount of 0.05 to 1.0 wt. % as reduced to $MnO_2$.

7. A dielectric film element as described in claim 6, wherein the dielectric layer is bonded onto a surface of the substrate.

8. A dielectric film element as described in claim 7, wherein the second electrode is bonded onto a surface of the substrate, and the dielectric layer is bonded onto the second electrode.

9. A dielectric film element as described in claim 8, wherein the dielectric layer is formed so as to have a thickness of 1 to 300 μm.

10. A dielectric film element comprising
a dielectric layer formed of a dielectric composition, the dielectric composition comprising, as a primary component, a composition represented by the following formula (2):

$$Pb_xBi_pSr_q(Mg_{y/3}Nb_{2/3})_aTi_{b-z}M_zZr_cO_3 \quad (2)$$

(wherein x, p, q, and y satisfy the following relations: $0.65 \leq x \leq 1.01$, $0.02 \leq p \leq 0.1$, $0.02 \leq q \leq 0.20$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W, which dielectric composition contains Ni in an amount of 0.05 to 2.0 wt. % as reduced to NiO);
a first electrode provided on the obverse surface of the dielectric layer;
a second electrode provided on the obverse surface or the reverse surface of the dielectric layer; and
a substrate which is provided on the reverse surface of the dielectric layer and which supports the dielectric layer, wherein, when a drive voltage is applied to the first and second electrodes, electrons are emitted from the obverse surface of the dielectric layer.

11. A dielectric film element as described in claim 10, wherein the dielectric composition further contains Mn in an amount of 0.05 to 1.0 wt. % as reduced to $MnO_2$.

12. A dielectric film element as described in claim 11, wherein the dielectric layer is bonded onto a surface of the substrate.

13. A dielectric film element as described in claim 12, wherein the second electrode is bonded onto a surface of the substrate, and the dielectric layer is bonded onto the second electrode.

14. A dielectric film element as described in claim 13, wherein the dielectric layer is formed so as to have a thickness of 1 to 300 μm.

* * * * *

UNITED STATES PATENT AND TRADEMARK OFFICE
CERTIFICATE OF CORRECTION

| | |
|---|---|
| PATENT NO. | : 7,276,462 B2 |
| APPLICATION NO. | : 11/209332 |
| DATED | : October 2, 2007 |
| INVENTOR(S) | : Hirofumi Yamaguchi, Kei Sato and Toshikatsu Kashiwaya |

It is certified that error appears in the above-identified patent and that said Letters Patent is hereby corrected as shown below:

*Column 21, line 13*: please change "care" to --c are--

Signed and Sealed this

Twenty Second Day of April, 2008

JON W. DUDAS
*Director of the United States Patent and Trademark Office*